United States Patent Office.

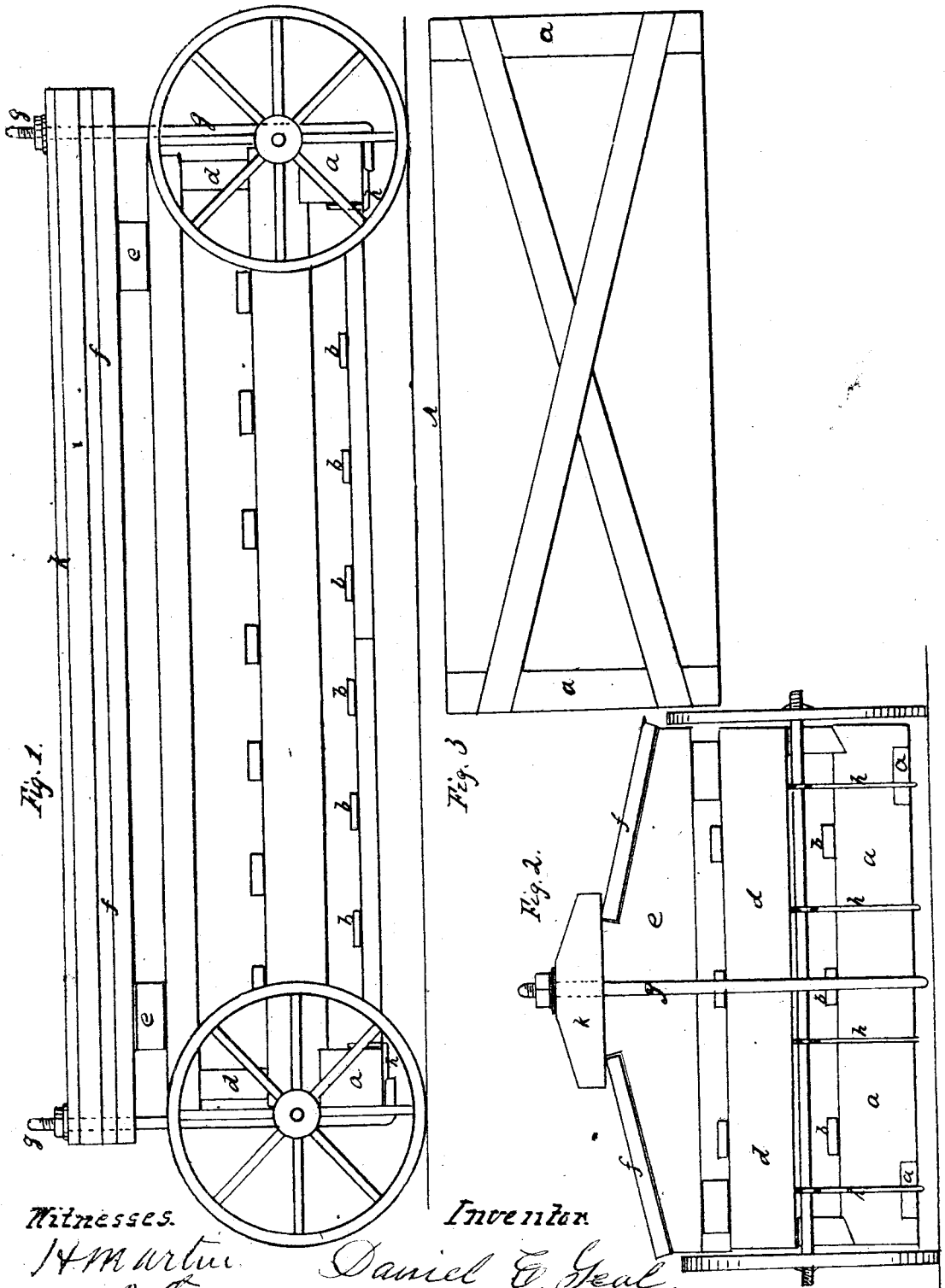

DANIEL E. TEAL, OF NORWICH, NEW YORK

Letters Patent No. 74,255, dated February 11, 1868.

IMPROVED CAR FOR TRANSPORTING AND DRYING PEAT.

*The Schedule referred to in these Letters Patent and making part of the same.*

TO ALL WHOM IT MAY CONCERN:

Be it known that I, DANIEL E. TEAL, of the town of Norwich, county of Chenango, and State of New York, have invented a new and improved Mode of Drying Peat, and of transporting it from the bed where it is dug, or from the mill where it is manufactured, to any desired locality; and I do hereby declare that the following is a full and exact description thereof, reference being had to the accompanying drawings, and to the letters of reference marked thereon.

The nature of my invention consists in the construction of portable cars or drying-racks so constructed that wheels can be attached or detached, and one set of four wheels can be made to answer for many cars or racks.

To enable others skilled in the art to make and use my invention, I will proceed to describe its construction and operation, reference being had to the accompanying drawings, in which—

Figure 1 is a longitudinal elevation, and

Figure 2 an end view of the same.

To make the car or rack, I take scantling, three by four inches, and for ordinary purposes make the car or rack four feet wide by twelve feet long. I take two pieces of scantling and frame them together transversely, as represented in fig. A of the drawing. Cross-bars $a$ are framed to the ends of these transverse pieces. Upon this frame, slats $b$ are laid both crosswise and lengthwise, which form a loose floor to spread peat upon. Upon this I place other transverse pieces $d$, cross-bars, and slats, in the manner above described, to form another floor to spread peat upon, and floors can be constructed in the same manner and for the same purpose, to any desired height. Upon the top of the car thus constructed and loaded, at each end, a cross-bar, $e$, is placed for the purposes of a roof, and of fastening the car. Upon the top and middle of the last-mentioned cross-bars, a board, $f$, is laid flat, to secure the frame tightly together, and also to form a part of the roof. Two or more iron rods $g$ must run from each of the bottom cross-bars to the top board $k$ of the roof, properly secured by nuts and screws, to fasten the whole frame together, so that it can be moved and handled without disturbing the peat. The car being thus loaded, and upon the tram-road, is ready to be transported to any desired locality by attaching the wheels. For the purpose of moving the car, wheels are constructed and attached to an axle or shaft. Suitable hooks $h$ are attached for the purpose of being hooked to the lower cross-bars of the car. The forward and hind wheels are coupled by means of the hooks, loosely clasping each axle, so as to allow the axle to revolve. The hooks are designed to elevate the cross-bars from one to two inches above the track, so as to clear the same, and are constructed to fit the shape of the cross-bars of the rack. The pressure of the load on the hooks will hold them to their places, and prevent the cross-bars from being either detached or displaced. Two hooks must be used for each axle, and so placed as to hold the load in balance. The design is that scantling be placed under the frame while being loaded, of sufficient size to allow the hooks attached to the axle to be conveniently placed under the cross-bars, so as to receive the same. The scantling can be removed, when the cross-bars are attached to the axle by means of the hooks.

When loaded and properly attached to the wheels on the track or tram-way, the machine and load can be pushed or drawn on the track to the desired location, where it is to be left for drying. Each end of the load can be raised (one end at a time) by means of a lever, and the hooks detached from the cross-bars. The loaded car will remain in the track until the peat is sufficiently dried. One set of wheels and axles will answer for many cars. If the load is too heavy to be moved by pushing, a rope or chain can be attached to the cross-bar, or any firm part of the car, and be moved by horse-power, in the manner of towing a canal-boat. It is supposed the road will be nearly level, and it will not be necessary to attach either thills or a pole to draw the car.

*Claim.*

What I claim as my invention, and wish to secure by Letters Patent, is—

The carriage, consisting of the car, constructed as described, provided with wheels attached thereto, by means of the hooks $h$, so formed, as to embrace and support the cross-pieces $a$, arranged substantially in the manner set forth and described.

DANIEL E. TEAL.

Witnesses:
H. N. WALTER,
G. A. HARRIS.